Oct. 17, 1961     C. L. KEY, JR., ET AL     3,005,133
DRIVE FOR INDICATING MEANS AND THE LIKE

Filed Feb. 12, 1958

CARROLL L. KEY, Jr.
RICHARD F. TRUFANT
                      INVENTORS

BY
                      ATTORNEYS

United States Patent Office 3,005,133
Patented Oct. 17, 1961

3,005,133
DRIVE FOR INDICATING MEANS
AND THE LIKE
Carroll L. Key, Jr., State College, and Richard F. Trufant, Bellefonte, Pa., assignors, by mesne assignments, to the United States of America as represented by the Secretary of the Navy
Filed Feb. 12, 1958, Ser. No. 714,932
7 Claims. (Cl. 318—15)

This invention relates to driving mechanism and particularly to mechanism for coupling a servo-motor with a potentiometer to be rotated by the servo-motor.

Servo-motor systems are conventionally used to produce mechanical motion of an indicating member, movable element or the like that is directionally proportional to the actuating signal for the servo-motor. Such systems are particularly useful in electronic signal processing systems wherein it is desirable to produce, for example, rotation of a potentiometer, and hence a varying electric signal, that is directly proportional to a complex electric signal or component thereof or the fluctuations of such a signal. Such systems are also useful to remotely position and indicate the position of aircraft accessories and the like such as landing gear, wing flaps, ailerons and the like.

Prior art servo-systems generally utilized limit or control switches to control operation of the driving motor or, alternately, maximum motion or rotation of the indicating member or the like. Such an arrangement invariably results in oscillation of the indicating member or motor-hunting and the consequent presence of stopping and starting transients which adversely affect the stability, accuracy, and reliability of the system as a whole. Such an arrangement further requires that components of the system be able to withstand a substantial portion of the torque developed by the driving motor.

The present invention contemplates a driver or indicating member, such as for example a one-turn potentiometer, having substantially a 360 degree rotation and driven through a reduction gear train by a servo-motor. The servo-motor in turn is driven by and in accordance with a control signal that may be of a complex nature such that the potentiometer may be rotated through substantially 360 degrees or as close to 360 degrees as the construction of the potentiometer will allow, which may be in excess of 359 degrees. Further, in accordance with the invention, there is provided between the gear train and the indicating member means to damp the driving motor when the maximum limits of the indicating member have been reached without preventing continued rotation of the servo-motor and consequent strain on the cooperating parts and means to prevent spinning of the indicator member while allowing rotation of the indicating member to its maximum usable positions.

It is therefore a principal object of the present invention to provide novel coupling means, in a device of the character described.

Another object of the present invention is to provide in a servo system means to prevent spinning of an indicating member movable through substantially 360 degrees and which does not affect the maximum available amount of rotation of the indicating member.

Another object of the present invention is to provide in a servo system means to damp and facilitate stopping of the servo-motor when the maximum limit of the indicating member has been reached.

Still another object of the present invention is the provision of a servo system for control of an indicating member which will allow continued rotation of the driving servo-motor after the maximum point of rotation of the indicating member has been reached without the requirement that the components of the system be able to withstand the full torque of which the motor is capable.

Still another object of the present invention is the provision of a more stable, accurate, and reliable servo system for controlling an indicating member wherein overdrive of the servo-motor cannot result in damage to the system and may be ignored in the design and manufacture of the system, thereby allowing the use of structurally weaker parts than heretofore and consequent reduction to manufacturing costs.

Still another object of the present invention is to provide a servo-system means for a position controlling and indicating system adapted for use in an acoustic-detection and direction-finding system in a self-propelled torpedo.

These and other objects and features of the invention, together with their incident advantages, will be more readily understood and appreciated from the following detailed description of the preferred embodiment thereof selected for purposes of illustration and shown in the accompanying drawings, in which.

Figure 1:
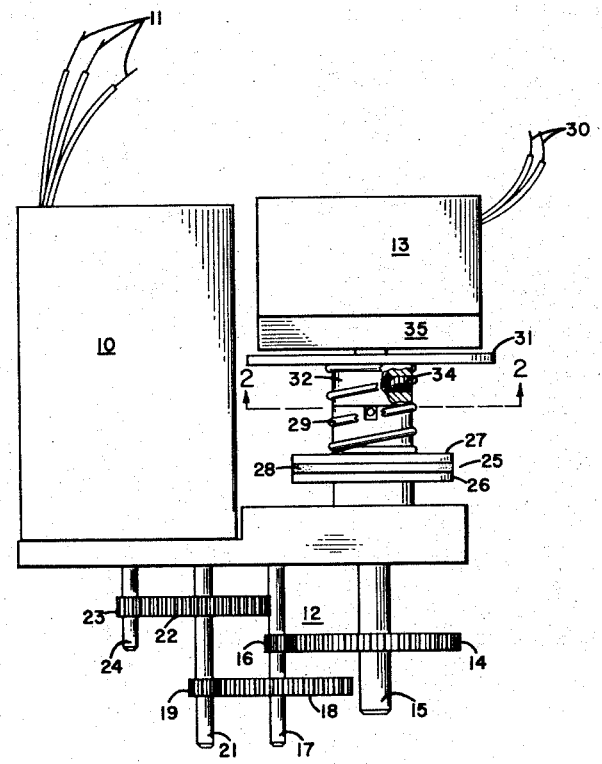
FIGURE 1 is a top plan view of the preferred embodiment of the invention.
Figure 2:
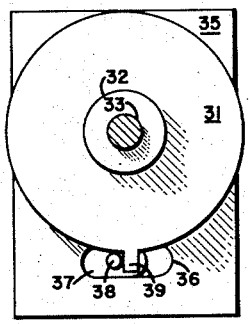
FIGURE 2 is a cross-sectional view taken on the line 2—2 of FIGURE 1.

Referring now to FIGURE 1, there is shown a conventional servo-motor 10 adapted to be driven at a speed and in a direction determined by a control signal supplied through wires 11 in the conventional manner. A gear train 12 having a reduction ratio of, for example 250 to 1 for driving a single turn potentiometer 13 more thoroughly described hereinafter, is comprised of a first spur gear 14 carried on an output shaft 15, which meshes with a second spur gear 16 carried on a first countershaft 17. A third spur gear 18 mounted on the first countershaft 17 meshes with a fourth spur gear 19 carried on a second countershaft 21. A fifth spur gear 22 mounted on the second countershaft 21 meshes with a sixth spur gear 23 mounted on the shaft 24 of the servo-motor. Disposed between the output shaft 15 of the gear train 12 and the potentiometer 13 is a conventional friction clutch 25 comprised of a first circular element 26 fixedly attached to the output shaft 15; a second similar circular element 27 oppositely disposed to the first circular element 26 and in alignment therewith; a surfacing material 28 such as for example coroprene, fixedly attached to one of the circular elements 26—27 to provide a sufficient amount of friction as to just maintain the circular element 26—27 in driving relationship but that will allow one circular element to slip with relation to the other when the rotation of the second circular element is restrained as described hereinafter; and a spring 29 adapted to urge the second circular element 27 toward the first circular element 26 and maintain them in abutting relationship.

Stop means as described more thoroughly hereinafter are disposed between the friction clutch 25 and the indicating member 13, such as for example a conventional one-turn potentiometer for producing a varying voltage proportional to a control signal having input leads 30 and designed to give substantially 360 electrical or mechanical degrees of rotation. A flat circular plate 31 having a center portion 32 fixedly attached to the potentiometer shaft 33 as by a set screw 34 and in axial alignment with the friction clutch 25 is adapted to receive the rear portion of the clutch and the spring to maintain the two portions of the clutch in abutting and driving engagement as described hereinbefore. An upstanding rectangular block 35 supports the potentiometer 13 and potentiometer shaft 33 in axial alignments with the clutch and is provided with a recess 36 for slideably receiving a stop member 37 having a pin 38 projecting outwardly therefrom for engagement with an ear 39 integral with the circular plate 31 such that the circular plate, and hence the potentiometer shaft, when rotated clockwise will be restrained at its maximum usable clockwise position and when rotated counterclockwise, will be rotated to its maximum usable counterclockwise position by reason of the fact that the stop member 37 is movable just sufficiently in oppositely disposed directions to obtain the aforementioned result.

The provision of a small amount of clearance between the circular plate 31 and the block 35 eliminates the possibility of any undue friction at this point and location of the stop member 37 such that a portion thereof is covered by the outer periphery of the circular plate 31 eliminates the necessity of providing means to maintain the stop element 37 in the recess 36.

As may now be obvious, the provision of the circular plate 31 and the stop means therefor prevent the existence of any undesirable torque on the potentiometer shaft 33 as would result in damage to the potentiometer and the friction clutch 25 allows continued rotation of the servo-motor 10 when the maximum points of rotation have been reached in addition to damping the servo-motor at these points for the case of excessive operation of the servo-motor. Further, the provision of the circular plate and the stop means therefor allows the potentiometer shaft to be rotated in either direction to its maximum usable position.

While a specific embodiment of the invention has been shown and described for purposes of illustration, it will be obvious to those skilled in the art that the invention may be otherwise embodied without departing from the spirit and scope of the invention.

What is claimed is.

1. In a position controlling and indicating system adapted for use in self-propelled torpedoes the combination comprising: a one-turn potentiometer having a rotatable shaft; driving means including a reduction gear train for rotatably driving said potentiometer; a servomotor for actuating said driving means; means to supply a control signal to said servo-motor whereby said servo-motor actuates said driving means in accordance with said control signal; a continuously engaged friction clutch connecting said driving means and said potentiometer; a circular plate having an outwardly extending ear and concentrically mounted on said potentiometer shaft; a support adjacent said circular plate and having a recess at least partially covered by said circular plate and tangential thereto; and a stop member having a forwardly projecting pin engageable with said ear slidably disposed in said recess.

2. In a position controlling and indicating system adapted for use in self-propelled torpedoes for producing a varying voltage proportional to a control signal the combination comprising: a one-turn potentiometer having a rotatable shaft; means to supply current to said potentiometer; driving means including a reduction gear train for rotatably driving said potentiometer; means for supplying a control signal; a servo-motor actuated by said control signal for actuating said driving means in accordance with said control signal; a continuously engaged friction clutch connecting said driving means and said potentiometer; a circular plate having an outwardly extending ear and concentrically mounted on said potentiometer shaft; a support adjacent said circular plate and having a recess at least partially covered by said circular plate and tangential thereto; and a stop member slidably disposed in said recess having a forwardly projecting pin engagable with said ear, said stop member being movable a sufficient distance whereby the potentiometer may be rotated to its maximum usable positions and said friction clutch slips when such positions have been reached.

3. In a position controlling and indicating system adopted for use in self-propelled torpedoes including a driven member, means for rotatably driving said driven member, the combination comprising: a base member positioned fixedly relative to said driven member and having a recess therein; a rotatable member adapted to rotate with said means for rotatably driving said driven member; a stop member adapted to be slidably received in said recess, said stop member being movable a sufficient distance effective to limit the rotation of said driven member.

4. In a position controlling and indicating system adapted for use in self-propelled torpedoes including a driven member, means for rotatably driving said driven member, a friction clutch connecting said driving means and said driven member, the combination comprising: a base member positioned fixedly relative to said driven member and having a recess therein; a rotatable member adapted to rotate with said means for rotatably driving said driven member; a stop member adapted to be slidably received in said recess, said stop member being movable a sufficient distance effective to limit the rotation of said driven member to substantially 360 degrees.

5. In a position controlling and indicating system adapted for use in self-propelled torpedoes including a driven member, means for rotatably driving said driven member, the combination comprising: a base member positioned fixedly relative to said driven member and having a recess therein; a rotatable member adapted to rotate with said means for rotatably driving said driven member; a friction clutch connecting said driving means and said driven member; a stop member adapted to be slidably received in said recess; said stop member being movable a sufficient distance whereby said driven member may be rotated to its maximum usable position, and said friction clutch slips when said position has been reached.

6. In a position controlling and indicating system adapted for use in self-propelled torpedoes, including a driven member, means for rotatably driving said driven member, the combination comprising: a base member positioned fixedly relative to said driven member and having a recess therein; a rotatable member adapted to rotate with said means for rotatably driving said driven member; a continuously engaged friction clutch connecting said driving means and said driven member; a stop member adapted to be slidably received in said recess; said stop member being movable a sufficient distance whereby said driven member may be rotated to its maximum usable position, and said friction clutch slips when said position has been reached.

7. In a position controlling and indicating system adapted for use in self-propelled torpedoes, for producing a varying voltage proportional to a control signal, the combination comprising: a means for supplying a control signal; a servomotor actuated by said control signal; a reduction gear train rotatably driven by said servomotor; a friction clutch driven by said reduction gear train; a one-turn potentiometer having a rotatable shaft; means to supply current to said potentiometer; a circular plate having an outwardly extending ear and concentrically mounted on said potentiometer shaft; a base adjacent to said circular plate having a recess at least partially covered by said circular plate and tangential thereto; a stop member slidably disposed in said recess having a forwardly projecting pin engageable with said ear, said stop member being movable a sufficient distance whereby said potentiometer may be rotated to its maximum useable positions and said friction clutch slips when such positions have been reached.

References Cited in the file of this patent

UNITED STATES PATENTS

| | | |
|---|---|---|
| 1,455,194 | Eaton | May 15, 1923 |
| 2,346,877 | Trofimov | Apr. 18, 1944 |
| 2,437,591 | Briskin et al. | Mar. 9, 1948 |

FOREIGN PATENTS

| | | |
|---|---|---|
| 757,029 | Great Britain | Sept. 12, 1956 |
| 758,514 | Great Britain | Oct. 3, 1956 |